US006882354B1

(12) United States Patent
Nielsen

(10) Patent No.: US 6,882,354 B1
(45) Date of Patent: Apr. 19, 2005

(54) SCROLL BARS WITH USER FEEDBACK

(75) Inventor: Jakob Nielsen, Atherton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/932,239

(22) Filed: Sep. 17, 1997

(51) Int. Cl.$^7$ .................................................. G09G 5/00
(52) U.S. Cl. ...................................................... 345/784
(58) Field of Search ................................ 345/784, 781, 345/341, 326–358, 123–125, 768; 707/102

(56) References Cited

U.S. PATENT DOCUMENTS

| | | | |
|---|---|---|---|
| 4,984,179 A | * | 1/1991 | Waldern ..................... 345/355 |
| 5,001,697 A | * | 3/1991 | Torres ......................... 345/342 |
| 5,039,937 A | * | 8/1991 | Mandt et al. |
| 5,283,560 A | * | 2/1994 | Bartlett |
| 5,339,390 A | * | 8/1994 | Robertson et al. ....... 345/355 X |
| 5,532,715 A | * | 7/1996 | Bates et al. |
| 5,608,850 A | * | 3/1997 | Robertson .................. 345/355 |
| 5,655,094 A | * | 8/1997 | Cline et al. ................. 345/786 |
| 5,689,628 A | * | 11/1997 | Robertson ............... 345/355 X |
| 5,745,109 A | * | 4/1998 | Nakano et al. ......... 345/355 X |
| 5,790,108 A | | 8/1998 | Salcudean .................. 345/184 |
| 5,880,733 A | * | 3/1999 | Horvitz et al. ............. 345/355 |
| 6,020,887 A | * | 2/2000 | Loring et al. ............... 345/786 |

FOREIGN PATENT DOCUMENTS

| | | | |
|---|---|---|---|
| EP | 0203324 A | 12/1986 | .......... G06F/15/72 |
| EP | 0159400 A | 10/1995 | .......... G06F/3/037 |
| JP | 408163411 A | * 6/1996 | |
| JP | 410093855 A | * 4/1998 | |
| JP | 410126673 A | * 5/1998 | |
| WO | WO 97 21160 A | 6/1997 | |
| WO | WO 98 08159 A | 2/1998 | |

OTHER PUBLICATIONS

Macintosh Human Interface Guidelines, Apple Computer, Inc., pp. 158–159, 1992.*
Wagstaff, S., "Sculpt 3D Upgrade Adds Features, . . . ," McWeek, V10, n5, p31(2), Feb. 1996.*
Matthies, K, et al, "Managing Mulitple Windows," Mac User, V6, n6, p273(6), Jun. 1990.*
"Turning Your Images for the Web.," Seybold Report on Internet Publishing, v1,n11, p12(2). Jul. 1997.*
"Super 3–D Gives a Better Picture of Designs . . . ," Design News, (Sep. 3, 1990) pp. 190.*
McGovern, D. E., "AT&T's Open Look Interface Gains Industry Support", AT&T Technology, vol. 3, No. 2, Jan. 1, 1998, pp. 52–54, XP000119268.
*Presentation Angles: Turning On, Off Elements or Changing Space by Louvres*, IBM Technical Disclosure Bulletin, vol. 37, No. 2B, Feb. 1994, pp. 323–325.
*Segmented Pointer Control for Personal Computer Displays*, IBM Technical Disclosure Bulletin, vol. 35, No. 4B, Sep. 1, 1992, pp. 266–268.

* cited by examiner

*Primary Examiner*—Greta Robinson
(74) *Attorney, Agent, or Firm*—Finnegan, Henderson, Farabow, Garrett & Dunner, L.L.P.

(57) ABSTRACT

A graphical user interface uses scroll bars having a single pixel width and a much larger scroll button or thumb. Both the scroll bar and the scroll button may be controlled to have selective degrees of transparency so that they underlying image information may be seen under certain conditions. In one application, the scroll bar itself is invisible until a cursor approaches to within a specified proximity. The graphical user interface permit scroll bars to be displayed which follow an arbitrary path in either two or three dimensions.

25 Claims, 17 Drawing Sheets

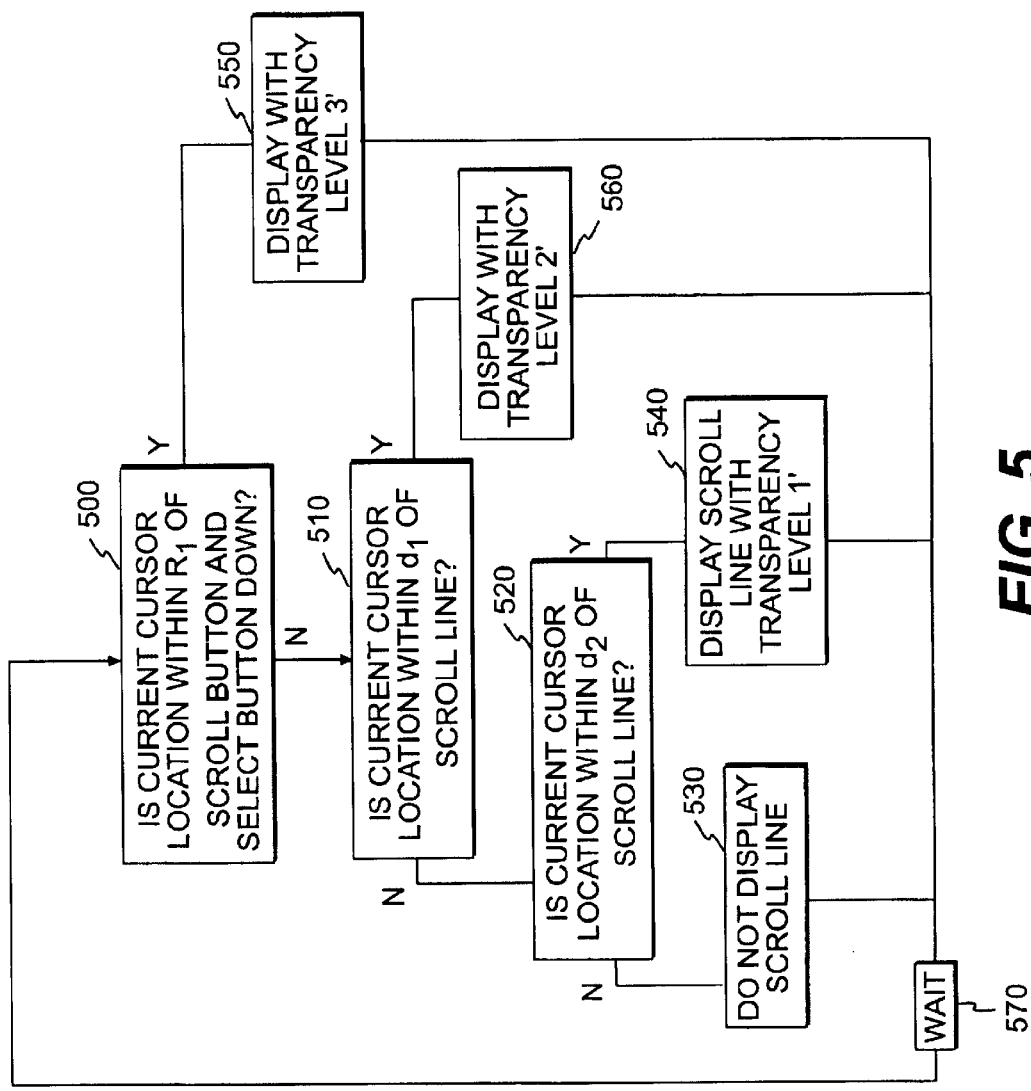

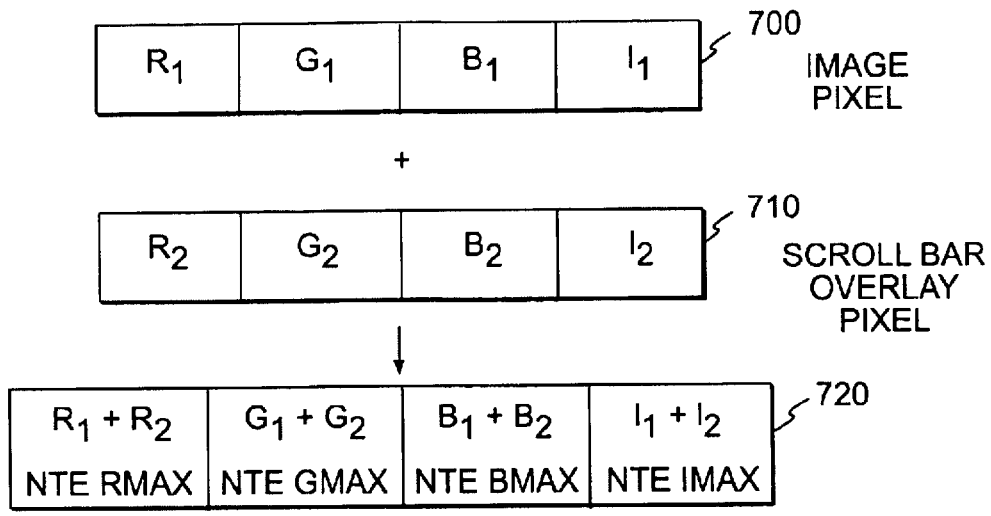
*FIG. 7A*
70% TRANSPARENT
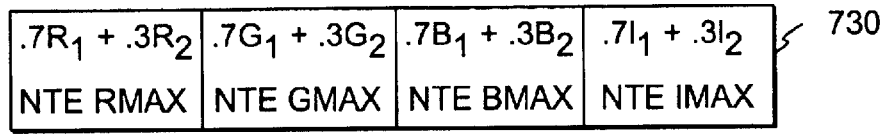
*FIG. 7B*
| TRANSPARENCY LEVEL | IMAGE | OVERLAY |
|---|---|---|
| DEFAULT | 80% | 20% |
| 1 | 60% | 40% |
| 2 | 40% | 60% |
| 3 | 20% | 80% |
*FIG. 7C*

SCROLL BARS WITH USER FEEDBACK

BACKGROUND OF THE INVENTION

1. Field of the Invention

The invention relates to computer systems and software and, more particularly, to a graphical user interface having scroll bars which are a single pixel wide and which, under certain conditions, may be invisible.

2. Description of Related Art

Scroll bars are known in the art which are rendered as a rather wide stripe running along the border of the scrollable area. More specifically, scroll bars are typically rendered as a vertical stripe when controlling scrolling in a vertical direction and are rendered as a horizontal stripe when controlling scrolling in a horizontal direction. These are generally reasonably unobstrusive when there is no more than a single scroll bar for each direction on a display page.

Scroll bars have a scroll button (sometimes called a scroll "thumb" or "elevator") which the user grabs in order to move the view of the display controlled by the scroll bar. When the user selects a scroll button, and drags it in a direction, the scrolling displayed within the window controlled by the scroll bar is changed in accordance with a relative position of the scroll button.

The Problems

Using traditional approaches, there is a limit as to how narrow a scroll bar can be since the user needs to be able to position the cursor over the scroll button in order to move it. In the traditional approaches, the scroll button is confined to the channel defined by the scroll bar. Therefore, as the scroll bar gets narrower, finer and finer control of the movement of the cursor is required in order to successfully grab a progressively narrower scroll button in order to move it.

As graphical user interfaces become more complex, traditional scroll bars tend to dominate too much of the visual content of the screen. This is particularly true when viewing pages on the World Wide Web and other designs which multiple scrollable areas are intermixed with other material. It would be preferable if users could concentrate on the content or on the design of the page and not have the user interface machinery take up as much screen space and visual attention as they do.

SUMMARY OF THE INVENTION

In accordance with the invention, a one-pixel wide scroll bar is utilized. Sliding along this scroll bar is a much larger semi-transparent scroll button. Thus, the scroll button is freed from the constraints of the scroll bar channel.

The scroll button is drawn using a transparency effect, making it possible for the user to see any data that may be in the part of the screen that is overlaid by the scroll button. In fact, in some embodiments, the transparency with which the scroll button is displayed is a function of how close the cursor is to the scroll button.

The same type of transparency effect can be applied to the scroll bar itself. That is, when the cursor is relatively far from the scroll bar, the scroll bar may be completely invisible. However, as the cursor approaches the scroll bar, the scroll bar and/or the scroll button become progressively more visible, that is, they become more nearly opaque.

The scroll bars and buttons of the invention can be utilized with tactile feedback devices in order to provide a tactile indication, as well as a visual one, that the cursor is crossing over an area in which the scroll bar or a scroll button exists.

The scroll bar techniques disclosed herein are utilizable for controlling functions or objects in a three-dimensional virtual world and can be extended to controlling functions in an N-dimensional space. In an N-dimensional space, where N is greater than 2, the path followed by the scroll bar can be arbitrary, that is, the scroll bar is not constrained to follow a linear path. This provides great utility when moving objects or adjusting controls in a three-dimensional space.

The scroll bar techniques disclosed herein can be utilized with an eyetracker for providing control of the scroll bars as well.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the present invention will become apparent from the following descriptions, in which:

FIG. 5 is a flow chart of an exemplary process by which the transparency/opacity of a scroll bar may be controlled in accordance with one embodiment of the invention.

FIG. 7A is an illustration of one exemplary way in which image pixels can be combined with overlying pixels of a scroll bar to form a displayed image in accordance with one embodiment of the invention.

FIG. 7B illustrates an alternative way of determining a resulting pixel when an image pixel is combined with a 70% transparent (30% opaque) scroll bar pixel.

FIG. 7C illustrates a table for setting transparency levels for the various conditions described in conjunction with the earlier figures.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS

Figure 1A:
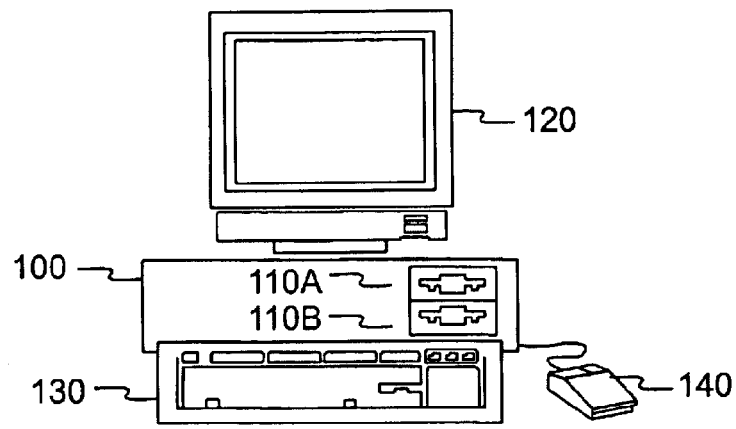
FIG. 1A is an illustration of a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
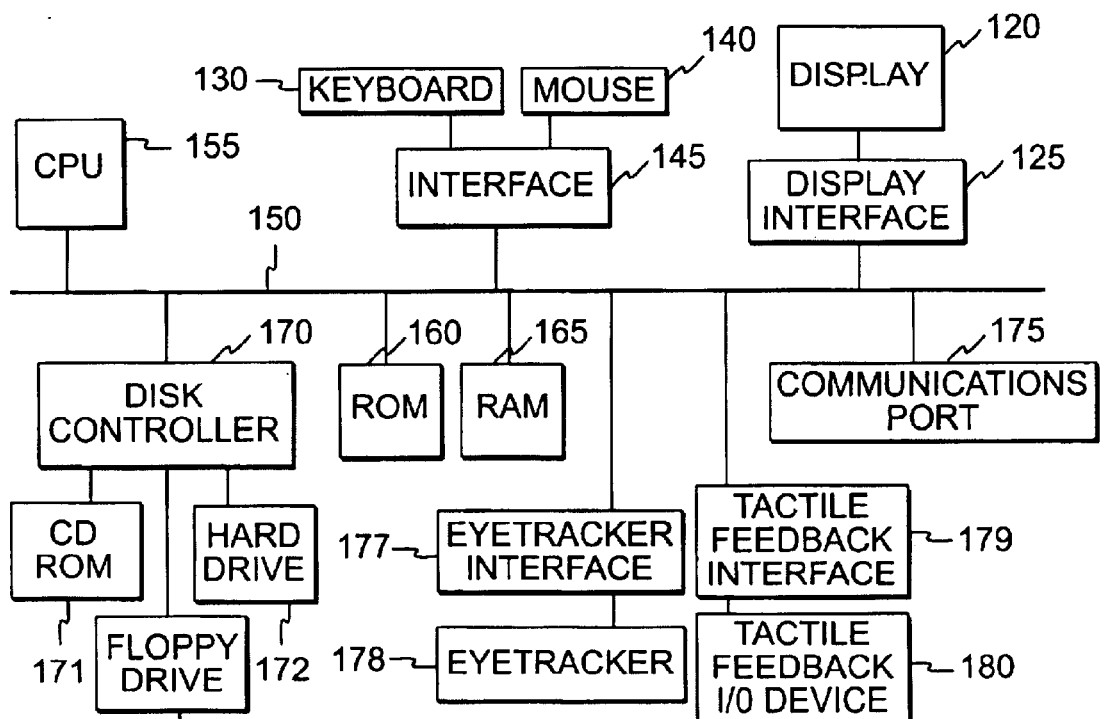
FIG. 1B is a block diagram of an exemplary bus architecture suitable for carrying out the invention.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on the display. Communications with external devices can occur over communications port 175. An eyetracker 178 is interfaced with bus 150 over eyetracker interface 177. Similarly, a tactile feedback input/output device 180 is interfaced to bus 150 over a tactile feedback interface 179.

Figure 1C:
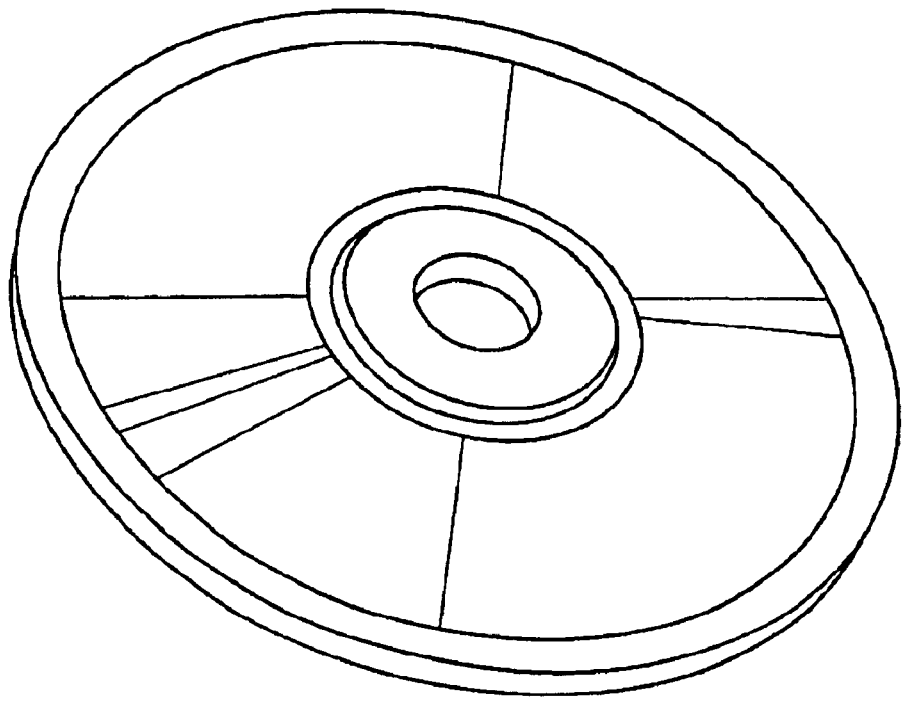
FIG. 1C is an illustration of an exemplary memory medium for carrying program information and data for use in carrying out the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention. Program and data information from such media is transmitted, in accordance with the invention, over a transmission link in the form of a carrier wave.

Figure 1D:
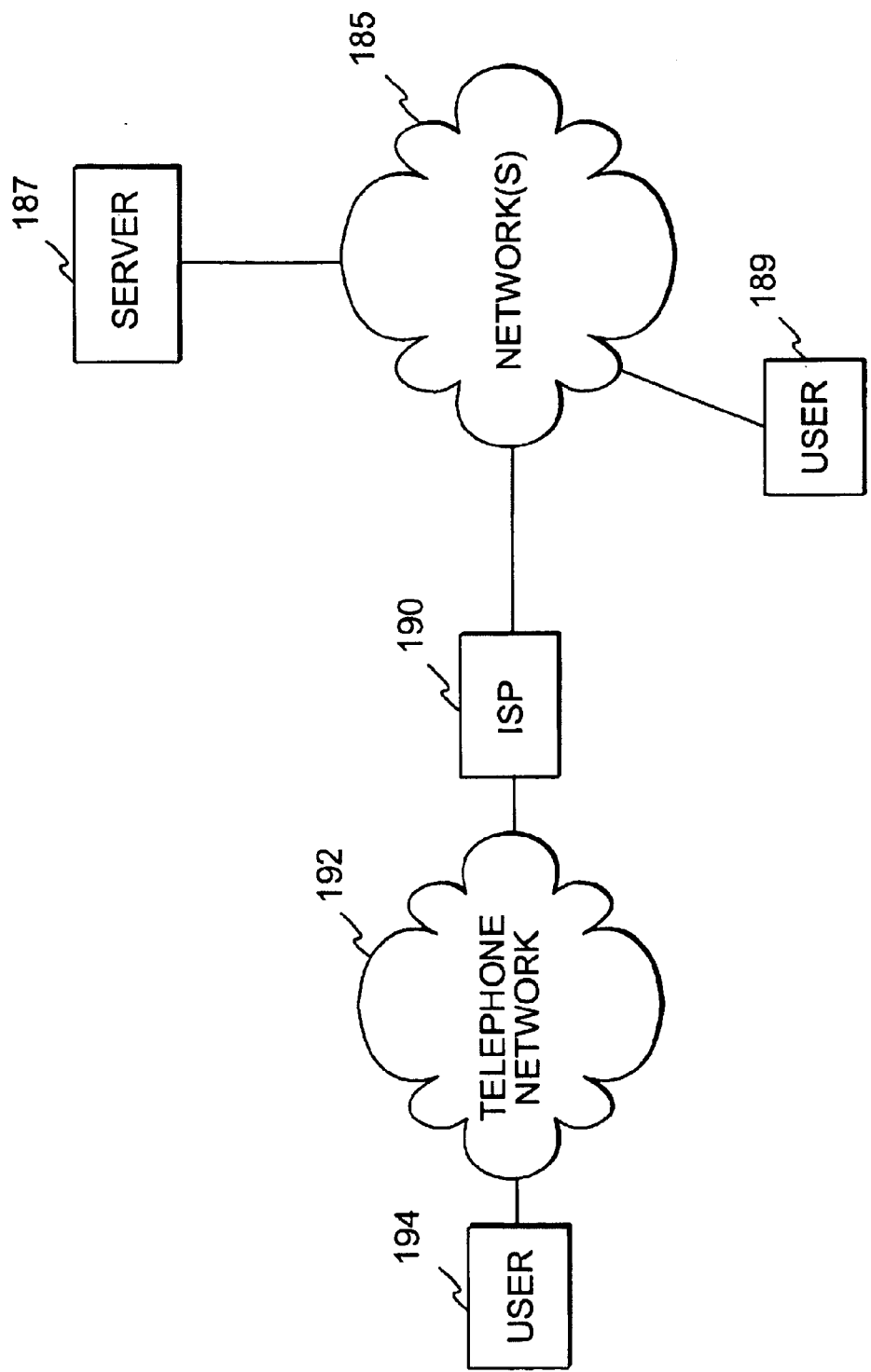
FIG. 1D is a block diagram of an exemplary network suitable for carrying program and data information useful for carrying out the invention.

FIG. 1D illustrates the use of computers of the type shown in FIGS. 1A and 1B in a network environment. Such computers can be used as user computers (194, 189) or as servers (187), sometimes with nominal differences of configuration. A user computer may connect to the network 185 either directly (189) or via a network service provider, such as an internet service provider 190. Program and data information used in carrying out the invention can be transmitted as a carrier wave over the network(s).

Figure 2A:
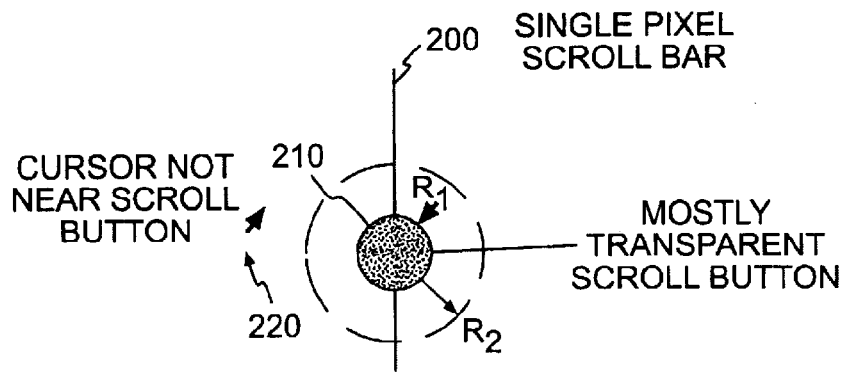
FIGS. 2A, 2B and 2C illustrate exemplary degrees of transparency with which a scroll button or thumb is displayed depending on cursor location or scroll button selection in accordance with one embodiment of the invention.
Figure 2B:
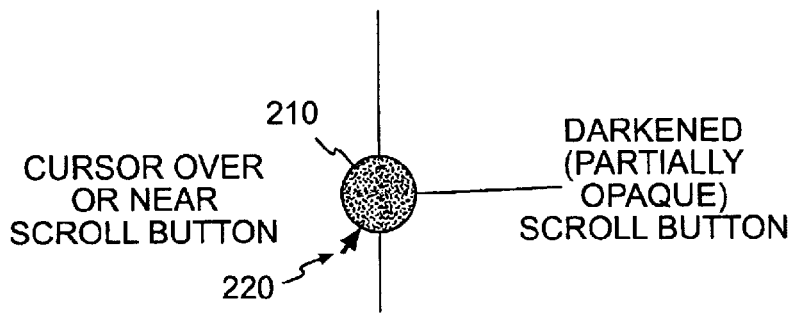
Figure 2C:
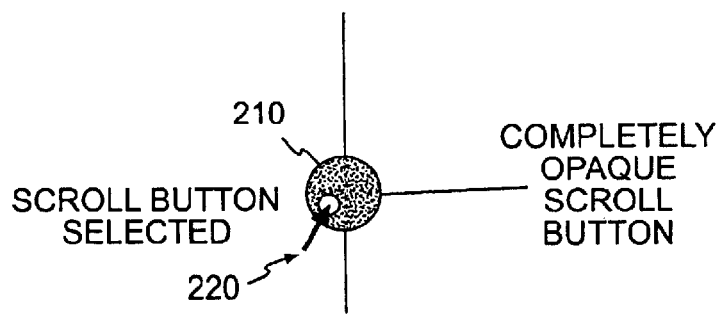

FIGS. 2A, 2B and 2C illustrate exemplary degrees of transparency with which a scroll button or thumb is displayed, depending on cursor location or scroll button selection, in accordance with one embodiment of the invention.

FIG. 2A shows a scroll button 210 which is mostly transparent. That is, any pixel values from an image picture plane over which the scroll bar (200) and scroll button are overlaid get most of the intensity value and color values whereas the scroll button, in this illustration, gets a small percentage, rendering it visible, but permitting the underlying image information to be seen. The scroll button, as shown in FIG. 2A has a radius R1. The dash line existing at radius R2 from the center of the scroll button represents a second distance from the scroll button which is utilized for controlling the transparency/opacity of the scroll button.

When the cursor 220, is not near the scroll button (i.e. is outside the threshold distance R2 from the scroll button), the scroll button remains mostly transparent. However, when the cursor 220 moves near (i.e. within the distance R2 from the scroll button's center) or over the scroll button (i.e. within the radius R1 of the scroll button) the scroll button becomes more nearly opaque and contributes more to the color and intensity values at each pixel, is discussed more hereinafter. This situation is shown in FIG. 2B.

As shown in FIG. 2C, when the scroll button is selected by, for example, depressing a mouse button while a cursor 220 is over the button 210, the scroll button becomes mostly or totally opaque.

Figure 3:
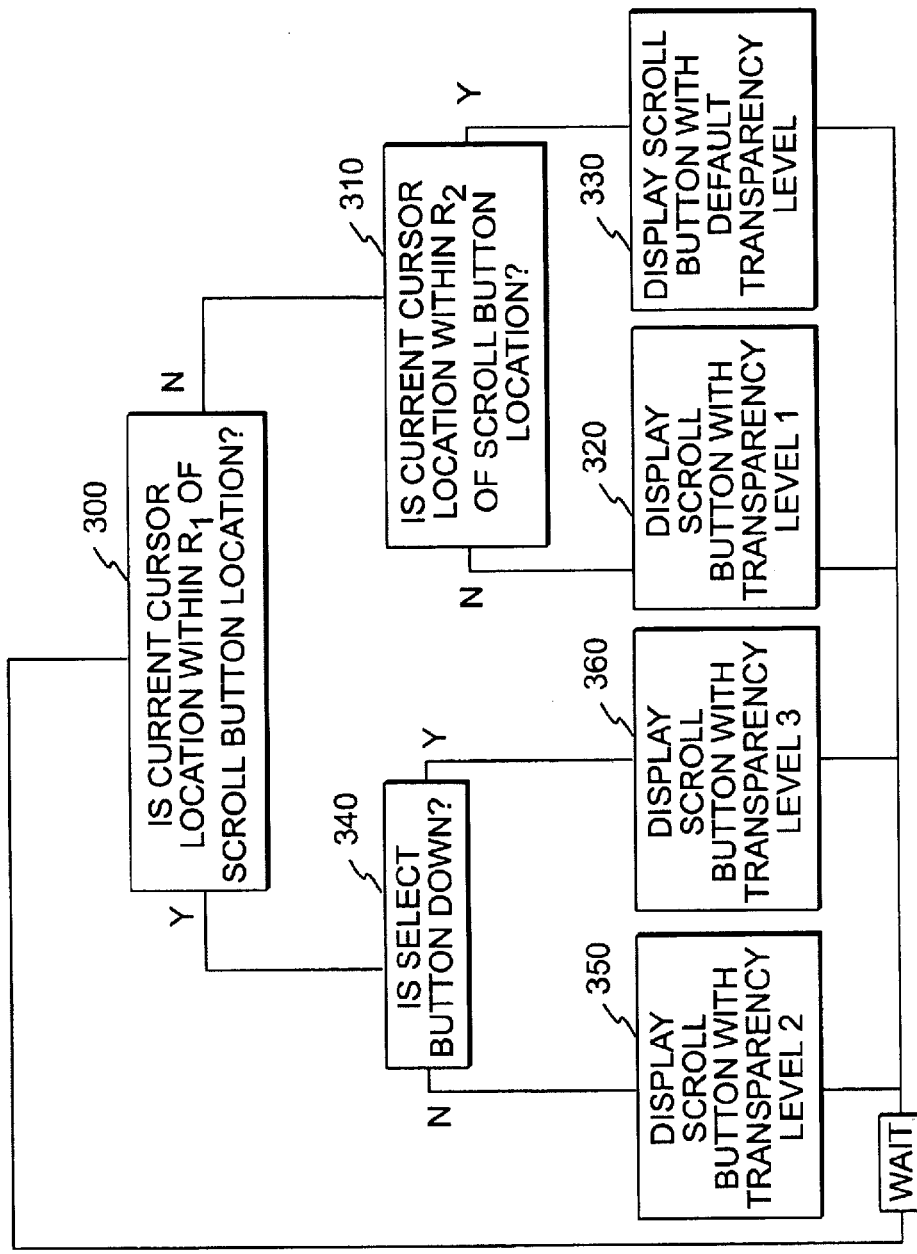
FIG. 3 is a flow chart of an exemplary process by which the transparency of a displayed scroll button may be controlled in accordance with one embodiment of the invention.

FIG. 3 is a flow chart of an exemplary process by which the transparency of the display of a scroll button may be controlled in accordance with one embodiment of the invention. The position of a cursor is periodically checked and, as shown in step 300, if the current cursor location is within R1 of the scroll button location (300-Y), a check is made (340) to see if the select button from the I/O device is depressed. If it is not (340-N), the scroll button is displayed with a transparency level 2 (350). If the select button is depressed (340-Y), the scroll button is displayed with a transparency level 3 (360). If the cursor location is not within R1 of the scroll button location (300-N), a check is made to determine if the current cursor location is within R2 of the scroll button location (310). If it is, (310-Y), the scroll button is displayed with transparency level 1 (320). If not (310-N), then the scroll button is displayed with the default transparency level (330). After an optional wait interval (370) after display of the scroll button with a particular transparency, the cursor location is again checked to determine its proximity to the scroll buttons and the process repeats.

Figure 4A:
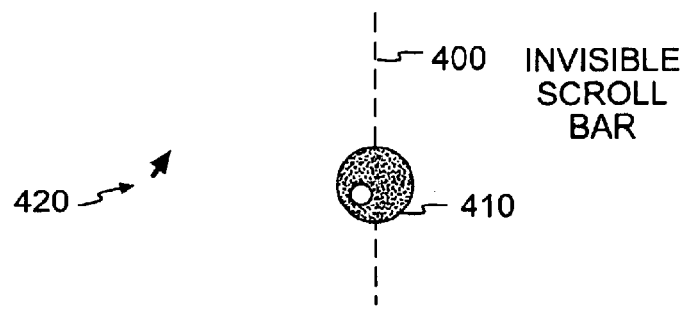
FIGS. 4A, 4B and 4C illustrate exemplary uses of an invisible scroll bar and the conditions under which it becomes partially or completely opaque in accordance with one embodiment of, the invention.
Figure 4B:
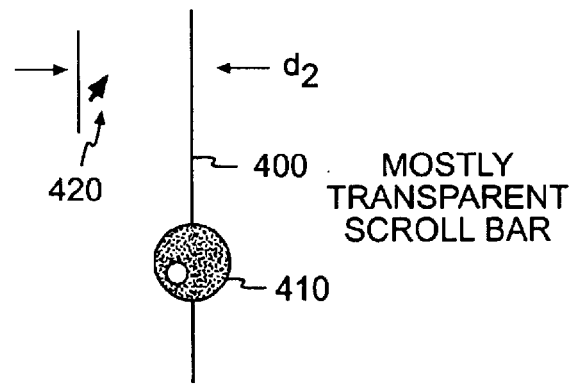
Figure 4C:
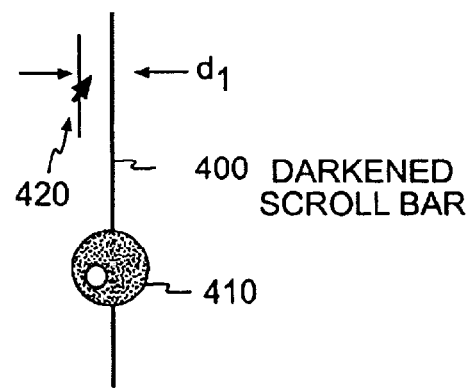

FIGS. 4A, 4B and 4C illustrate exemplary use of an invisible scroll bar and the conditions under which it becomes partially or completely opaque in accordance with one embodiment of the invention. The scroll button 410 and cursor 420 are positioned substantially as the corresponding elements shown in FIG. 2A. However, the scroll bar 400, as indicated by the dashed-line, is invisible.

As shown in FIG. 4B, when the cursor 420 approaches within distance d2 on either side of the scroll bar 400, the scroll bar changes from invisible to mostly transparent. As shown in FIG. 4C, when the cursor 420 comes within distance d1 on either side of scroll bar, the scroll bar becomes more nearly opaque.

Note that the transparency/opacity of the scroll button can be tied with or independent of the transparency/opacity of the scroll bar. It is preferred, when the scroll button is selected, that the scroll bar become concurrently opaque, even if the default display value for the scroll bar is invisible (completely transparent).

FIG. 5 is a flow chart of an exemplary process by which the transparency/opacity of a scroll bar may be controlled in accordance with one embodiment of the invention.

The location of the cursor is periodically checked and if the current cursor location is within R1 of the scroll button (500-Y), the scroll line will be displayed with transparency level 3' (550). Otherwise (500-N), a check is made to see if the current cursor location is within d1 of the scroll line (510). If it is (510-Y), the scroll line is displayed with transparency level 2' (560). If it is not (510-N), a check is made to see if the current cursor location is within d2 of the scroll line (520). If it is (520-Y), the scroll line will be displayed with transparency level 1' (540). Otherwise (520-N), the scroll line will not be displayed at all (530) or in other words, the scroll line will be displayed with complete transparency. Once the scroll line is displayed with the selected transparency, after an optional wait (570), the location of the cursor is checked again and the process repeats.

Figure 6:
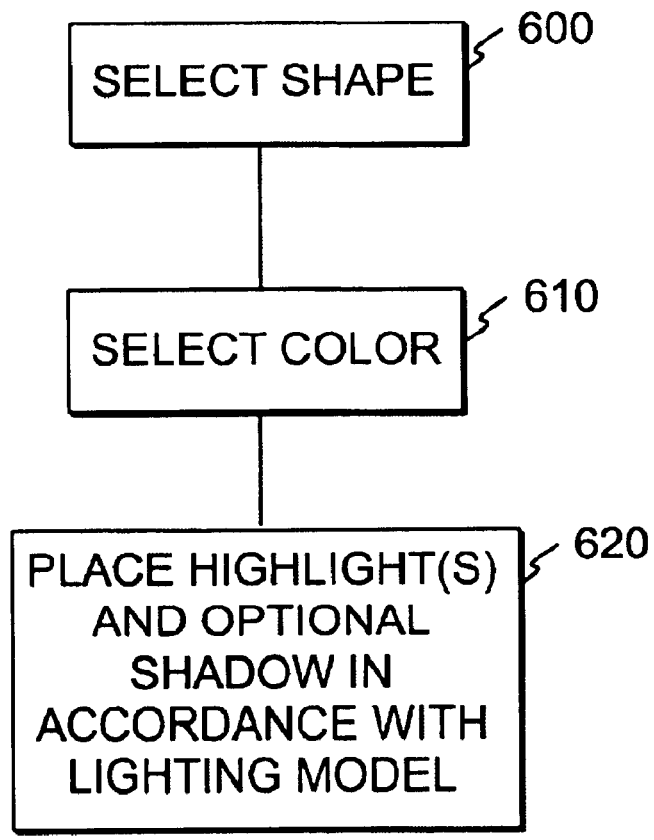
FIG. 6 is a flow chart of a high level design process for a scroll button in accordance with one embodiment of the invention.

FIG. 6 is a flow chart of a high level design process for a scroll button in accordance with one embodiment of the invention. At step 600, the shape for the scroll button is selected. The preferred appearance for a two-dimensional display is a portion of a 3-D sphere, giving the impression of a spherical surface which rises from the plane of the display screen. In a three-dimensional representation, a full three-dimensional sphere would be the preferred representation. This will sometimes be called a scroll marble. It is of course known how to create a two-dimensional projection of a three-dimensional scene.

In step 610, the color for the selected shape is determined. There is no particular preference for color other than it should contrast with the background. In one implementation, the color red was used with good effect. In step 620, one or more highlights are placed and an optional shadow is represented in accordance with the lighting model (620). Graphical user interfaces typically have design standards which include a lighting model. Typically, the light source originates off the screen in the upper left hand corner and is located between the screen and the user. The placement of the highlights and the shadow for the scroll button or scroll marble would then be established based on the position of the light source and the intended three-dimensional effect to be achieved with the scroll button.

FIG. 7A is an illustration of one exemplary way in which image pixels are combined with scroll bar overlay pixels to form a displayed image in accordance with one embodiment of the invention. In the example shown in FIG. 7A, a four value representation of a color pixel is shown at 700. In this representation, red intensity R1, green intensity G1, and blue intensity B1 represent the color values for the pixel. The intensity level I1 represents the overall intensity of the pixel whereas the R1, G1, B1 triplet represents the color value. The scroll bar is represented by a plurality of pixels, one pixel of which is illustrated at 710. Like the image pixel 700, the scroll bar pixel 710 has color components R2, G2 and B2 and intensity component I2. In a typical implementation, image pixels would come from an image plane and overlay pixels, such as those used to create a scroll bar and other functional representations would be found in one or more overlay planes. The value of the actual picture displayed on a pixel from the image plane is combined with a corresponding pixel from an overlay plane, as illustrated in item 720. This is a fairly simplistic exemplary combination algorithm in which the red, green, blue and intensity pixels from the image plane are combined with the corresponding pixel from the overlay plane and the resulting sum limited so it does not exceed the maximum value permitted for the color component or intensity value of the pixel. Although the color representation illustrated here uses red, green and blue color values, it is also possible to combine pixels utilizing the hue, saturation and intensity (Y,U,V) notation for color representation.

FIG. 7B illustrates an alternative way of determining a resulting pixel when an image pixel is combined with (in this example) a 70% transparent (30% opaque) scroll bar pixel. For a region in which 70% transparency is desired, the values of image pixels and overlay pixels are combined as illustrated at 730. Since most of the pixel information should originate from the underlying image pixel, it is weighted more heavily (0.7) than the overlay pixel. The scroll bar overlay pixel is designed to be relatively transparent and to defer to the color and intensity values of the image pixel. Accordingly, it is weighted only 30%. Thus, considering the red component, 0.7R1+0.3R2 will be the color value for the red component of the resultant pixel, provided that sum does not exceed the red component maximum value. Similar calculations are made for each of the blue, green and intensity levels of the color representation.

FIG. 7C illustrates a table for setting transparency levels for the various conditions described above. A look-up table 740 is one way in which the various levels of transparency may be established for a system implementing the various aspects of the invention. Transparency levels are set in column 741. They include a default level, a level 1, a level 2 and a level 3 transparency. The percentage of the resultant pixel that should originate with the image plane is given for the various transparency levels in column 742. The corresponding value for the overlay pixels is given in column 743. Note that in this particular implementation the transparency levels default, 1, 2 and 3 are assumed to be equal to the default prime 1', 2' and 3' values set forth above. Thus, although it is possible to set different transparency levels for the scroll bar and the scroll button, it is preferred that they share transparency levels of the same value as shown in table 740.

Figure 8:
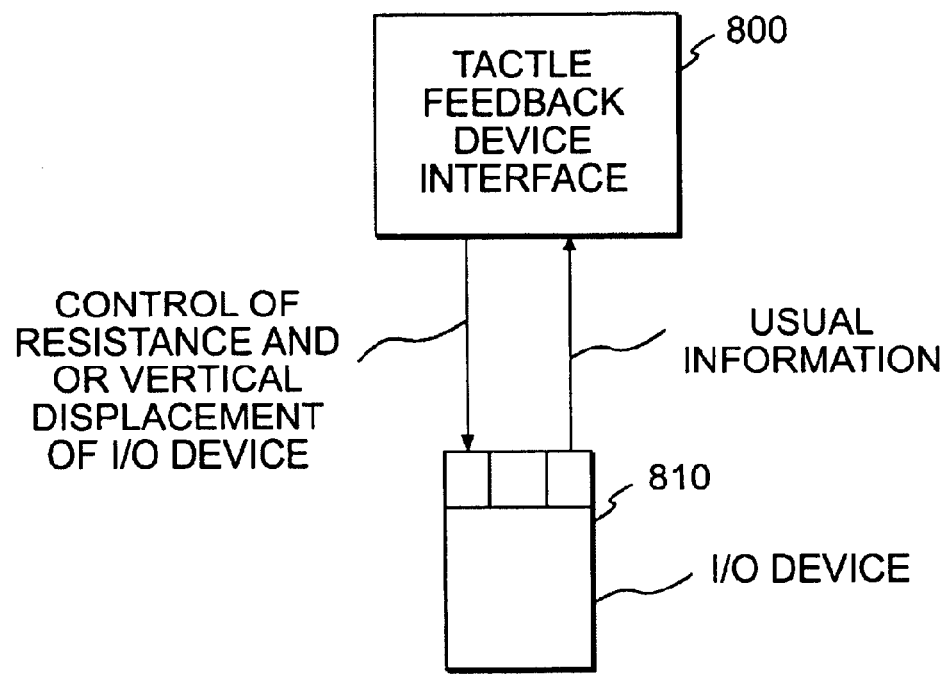
FIG. 8 illustrates interaction between an input/output device equipped with tactile feedback and the computer over a tactile feedback device interface.

FIG. 8 illustrates interaction between an input/output device, equipped with tactile feedback and the computer over a tactile feedback device interface. A tactile feedback device interface 800 receives the usual positioning information from the input/output device 810. However, the processor shown in FIG. 1B provides control of resistance and movement based on the positioning of the cursor. Tactile feedback devices and their interfacing to computers is well known in the art.

Figure 9A:
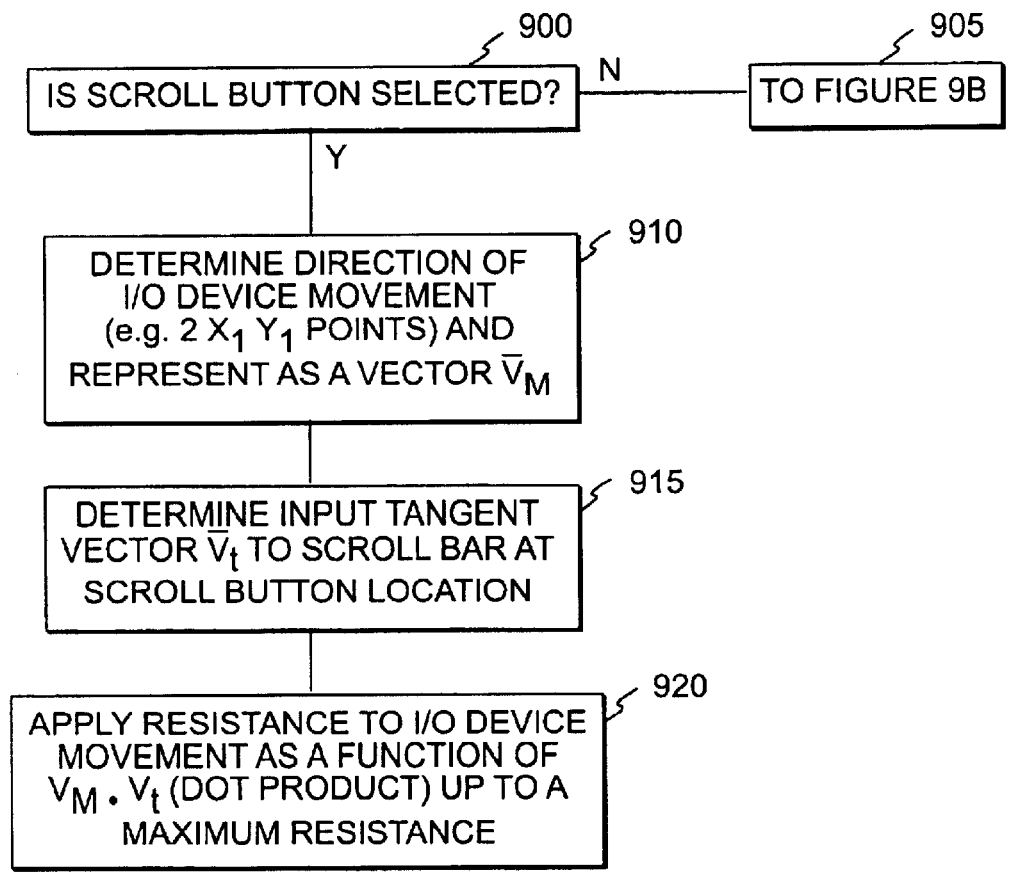
FIGS. 9A and 9B are a flow chart of an exemplary process for controlling tactile feedback to indicate the presence of a scroll bar or a scroll button when a cursor passes over and to increase resistance when the scroll button is selected and attempts to move away from the path of the scroll bar.
Figure 9B:
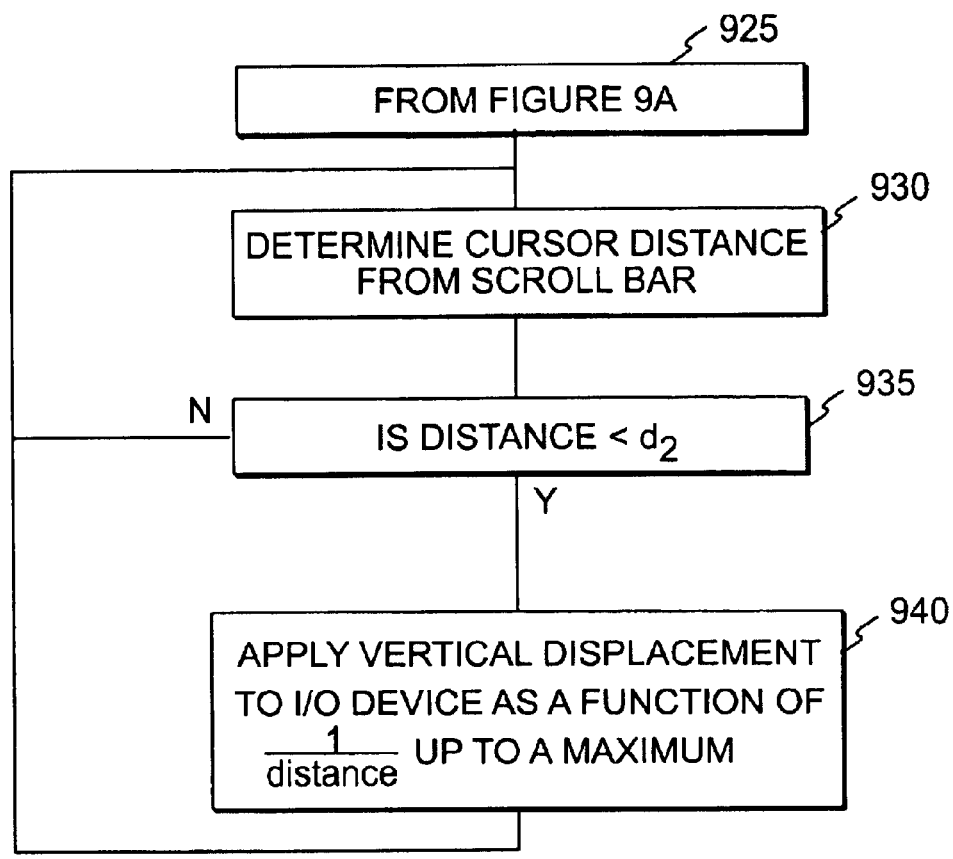

FIGS. 9A and 9B are a flow chart of an exemplary process for controlling tactile feedback to indicate the presence of a scroll bar or a scroll button when a cursor passes over and to increase resistance when the scroll button moves away from the path of the scroll bar. The tactile operation varies depending upon whether the scroll button is selected. If it is not (900-N), the portion of the process described in FIG. 9B is followed (905). If the scroll button is selected (900-Y), for example, by placing the cursor over it and pressing the left mouse button, a determination is made of the direction in which the I/O device is moving. This can be done, for example, by determining the XY values of two points at which the cursor is located at different instance of times and calculating a vector $\overline{V}_m$. Similarly, a unit vector $\overline{V}_t$ is utilized to represent the direction in which the cursor should be moving to parallel the scroll bar at that location (915). Resistance is applied to the input/output device movement (920) as a function of $\overline{V}_m \cdot \overline{V}_t$ (dot product) up to a maximum resistance. This is a vector dot product and the value of the resistance is applied so as to impede the motion of the input/output device away from the scroll bar path.

In FIG. 9B, if the scroll button is not selected (925), the cursor distance from the scroll bar is determined (930). If the distance is less than d2 (935-Y), a vertical displacement to the I/O device may be applied as a function of one divided by the distance up to a maximum value (940). If the cursor is outside a distance d2 from the scroll bar, or after the vertical displacement has been applied, the process reverts back to before block 930. The purpose of this is to permit the user to feel a bump or a resistance to the movement of the scroll bar when a scroll bar is crossed over. This should be applied, preferably when the scroll bar is visible to make it apparent why resistance was encountered as a cursor was attempted to be moved.

Figure 10:
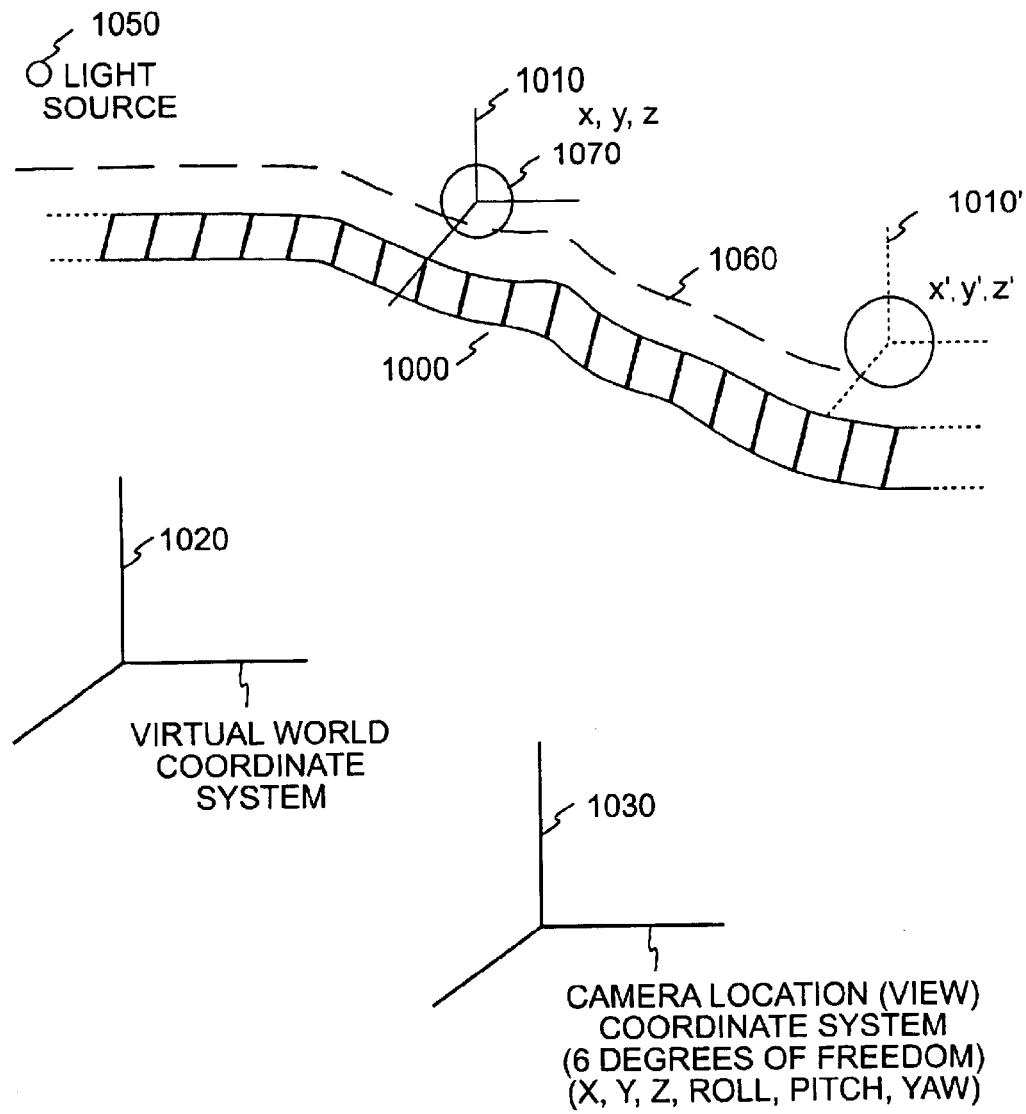
FIG. 10 is an illustration of a scroll bar which follows an arbitrary path in a three-dimensional virtual world and relevant coordinate systems useful in representation when viewing a scroll bar and objects in that world.

FIG. 10 is an illustration of a scroll bar which follows an arbitrary path in a three dimensional virtual world and relevant coordinate systems useful for representation and viewing the scroll bar and objects in that world. In a three-dimensional virtual world, it is common to place a light source 1050 as indicated and a camera at a position represented by the origin of coordinate system 1030. The virtual world coordinate system is shown at 1020. Note that the camera has six degrees of freedom with respect to the virtual world coordinate system, namely X, Y, Z, roll, pitch and yaw. When the camera location changes, to a different location, the virtual world scene is transformed to reflect the view from the new location. Thus, a generalized coordinate system transform can be utilized to move the camera in the virtual world space. Similar transformations can be utilized to move the light source. These transformations are well known in the art. The three-dimensional scene depicted in FIG. 10 is that of a railroad track which runs from a foreground location up a hill to the left toward a background location. The railroad tracks 1000 are paralleled by a scroll bar path 1060 which parallels the arbitrary path of the railroad tracks. A scroll sphere or marble 1010 is shown at point X, Y and Z in the virtual world coordinate system. When the cursor is utilized to select the scroll marble centered at coordinate system 1010, it can be dragged along the scroll path 1060 using the techniques described above, to place the scroll marble at location X', Y' and Z' shown at coordinate system 1010'. The scroll marble described above can be utilized, for example, to position the location of an object, such as a train engine, at a location along the tracks 1000 as desired. For example, this can be utilized to position the train engine at a particular point in order to start a simulation animation of the train moving through the virtual world.

It is particularly important to notice that the scroll marble 1070 can be referenced to either the virtual world coordinate system 1020 or to the camera location coordinate system 1030. The difference between the two attachments or references will be discussed hereinafter.

Figure 11:
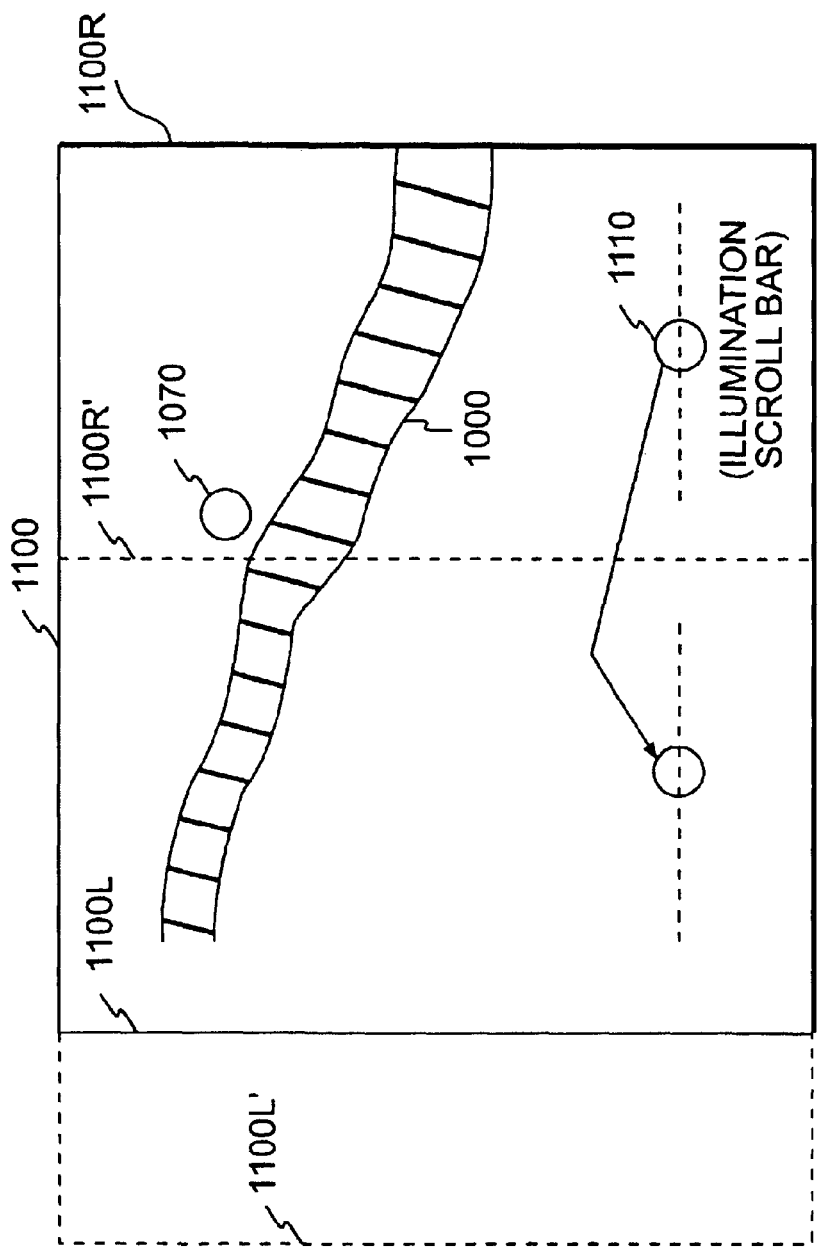
FIG. 11 illustrates a scroll bar attached to a camera coordinate system and a scroll bar attached to the virtual world coordinate system and views displayed when the camera view point rotates.

FIG. 11 illustrates a scroll bar 1110 attached to a camera coordinate system and a scroll bar 1070 attached to a virtual world coordinate system in views displaced by camera rotation. The area bounded by the solid box 1100 represents the view shown in FIG. 10 of the railroad tracks 1000 and scrolling marble 1070. Scrolling marble 1070 is attached (or referenced to) to the coordinate system of the virtual world. Thus, when the scrolling marble is dragged along the path 1060 which parallels the railroad tracks 1000, its coordinates will change with respect to the virtual world coordinate system alone. In the lower right-hand corner of box 1100, is an illumination scroll bar having an invisible scroll bar with a partially transparent scroll button 1110. This particular scroll bar and scroll button are referenced to the camera coordinate system and not the virtual world coordinate system. Thus, when the camera is rotated to the left, the rightmost extent or edge of the view will move from location 1100R to 1100R' and the leftmost edge of the view will move from 1100L to 1100L'. Thus, the vertical dashed lines in FIG. 11 represent the edges of the camera view after rotation. Note that by virtue of camera rotation, scroll marble 1070, affixed to the virtual world coordinate system is no longer in the field of view. However, scroll button 1110, attached to the camera coordinate system moves from its location shown before the move to maintain the same position relative to the right edge of the camera view after the move. Thus, scroll button 1110 is never out of the camera view, because it is affixed or referenced to the camera coordinate system. However, scroll marble 1070 affixed or referenced to the virtual world coordinate system does move out of the camera view when the camera rotates.

Figure 12:
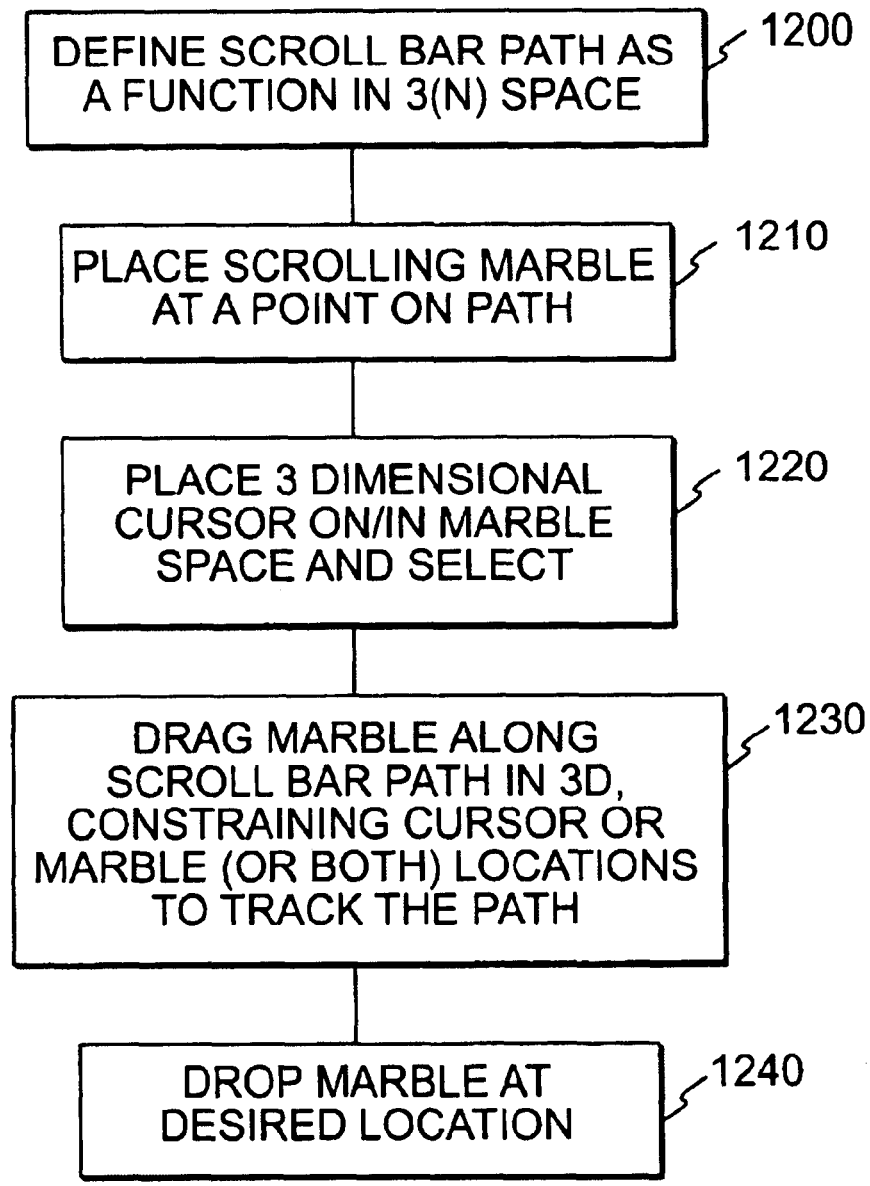
FIG. 12 is a flow chart of a process for moving a three-dimensional scroll marble along an arbitrary three-dimensional scroll path.

FIG. 12 is a flow chart of a process for moving a three-dimensional scroll marble along an arbitrary three-dimensional scroll path. A scroll path is defined as a function in a three (or N) dimensional space (1200). The representation of the function in three space can be done via table, by definition as a continuous function or as a piecewise continuous function. A scrolling marble is placed at a point on the path (1210). The only restriction is that the center of the scrolling marble should satisfy the path function as defined above. When a three-dimensional cursor is placed on or in the marble space and selected (1220), it may be dragged along the scroll bar path in three-dimensions, preferably constraining the cursor or the marble or both to follow the scroll bar path (1230). One can determine if the cursor is on or in the marble space by determining if the cursor position $X_c, Y_c, Z_c$ is within the marble radius of the center of the marble, $X_m, Y_m, Z_m$. Constraining the cursor or the marble or both to move along the path is done by ensuring that only points which satisfy the path function are permitted for positioning of the cursor or the marble's center. Once the marble has been dragged to the desired location (1240), the select button on the I/O device is released and the marble remains until moved again. Although the illustration has been given with respect to three space, the techniques can be extended to N-dimensional spaces. However, because of the obvious constraints on viewing and on the human mind when dealing in spaces beyond three dimensions, one would expect that the variables would be visualized or considered three at a time if the dimensionality of the space were greater than 3.

Figure 13:
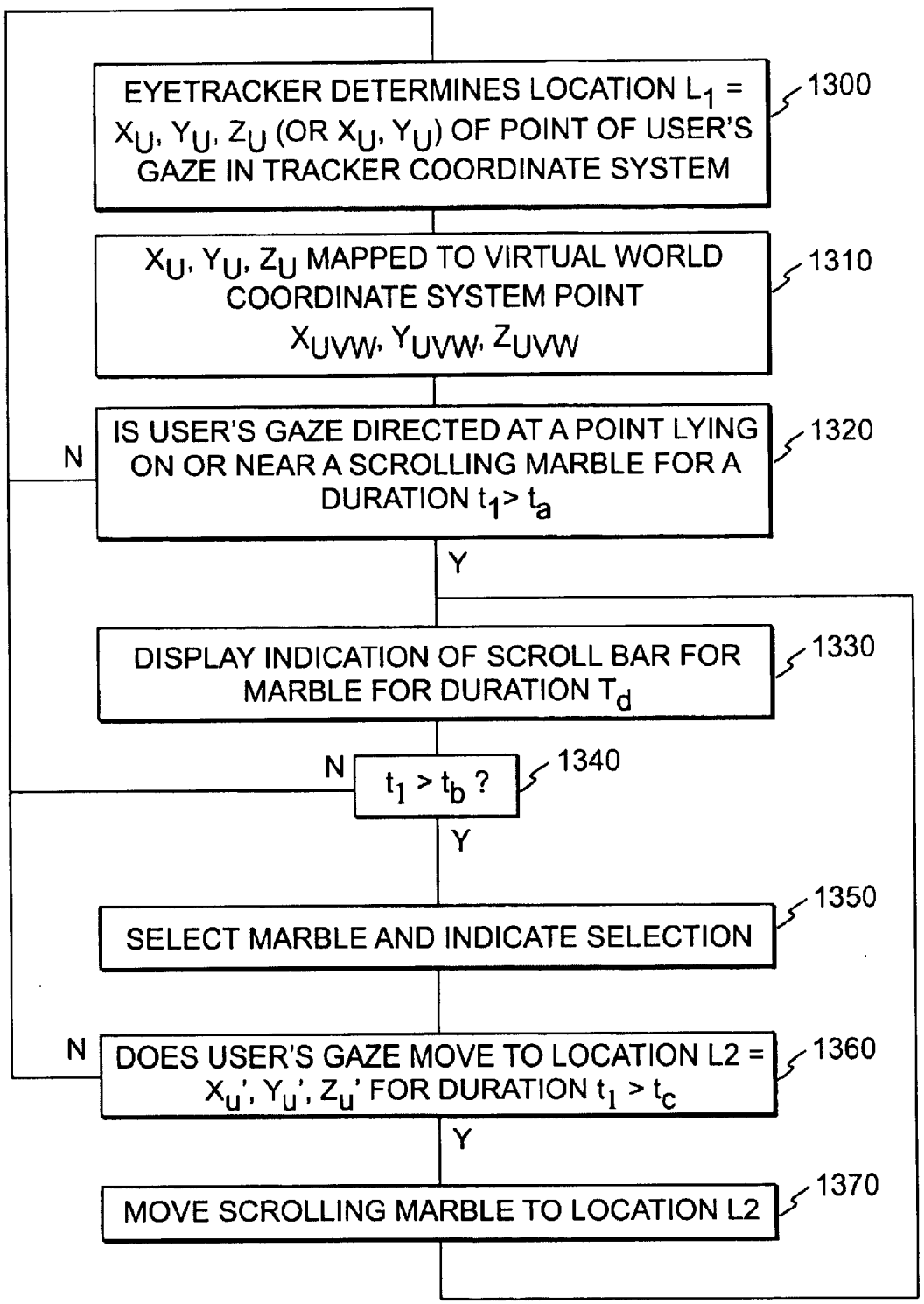
FIG. 13 is a flow chart of a process for using an eyetracker to select a scroll bar and/or scroll button and for dragging the scroll button along the scroll bar.

FIG. 13 is a flow chart of a process for using an eyetracker to select a scroll bar and/or scroll button and for dragging of the scroll button along the scroll bar. An eyetracker determines the location $L_1$ of a user's gaze at point $X_u, Y_u, Z_u$, (or $X_u, Y_u$ in two dimensional space) (1300). The eyetracker necessarily determines location with reference to the tracker's coordinate system. The location at $X_u, Y_u, Z_u$ and the tracker's coordinate system is then mapped to the virtual world coordinate system point $X_{uvw}, Y_{uvw}, Z_{uvw}$ (1310). If the users gaze is directed at a point lying on or near a scrolling marble for a duration $t_1 > t_a$ (1320-Y), the scroll bar for the marble is activated—that is, made visible or made more visible for a duration $T_d$ (1330). If $t_1$ is greater than value $T_b$ (1340-Y) ($t_b > t_a$), the marble is indicated as selected in one or more customary fashions (1350). These may include causing the cursor to flash, changing color or inverting the black and white pixels. Other ways are known for indicating such a selection. Once the marble has been selected, a check is made to see if the user's gaze moves to a location $L_2$ having values $X_u', Y_u'$ and $Z_u'$ for a duration $T_1 > T_c$ where $T_c$ is the third duration (1360). If it does (1360-Y), the scrolling marble is physically moved to location $L_2$ and the process returns to before step 1330. If either 1320-N, 1340-N or 1360-N is true, the process reverts to the beginning and repeats. Note that once a scroll bar for the marble has been activated, it is the time out of the duration $T_d$ which clears the scroll bar unless other conditions exist. It may be desirable to use an affirmative scroll bar turnoff under certain conditions, such as gazing at a scroll bar turnoff button.

Figure 14:
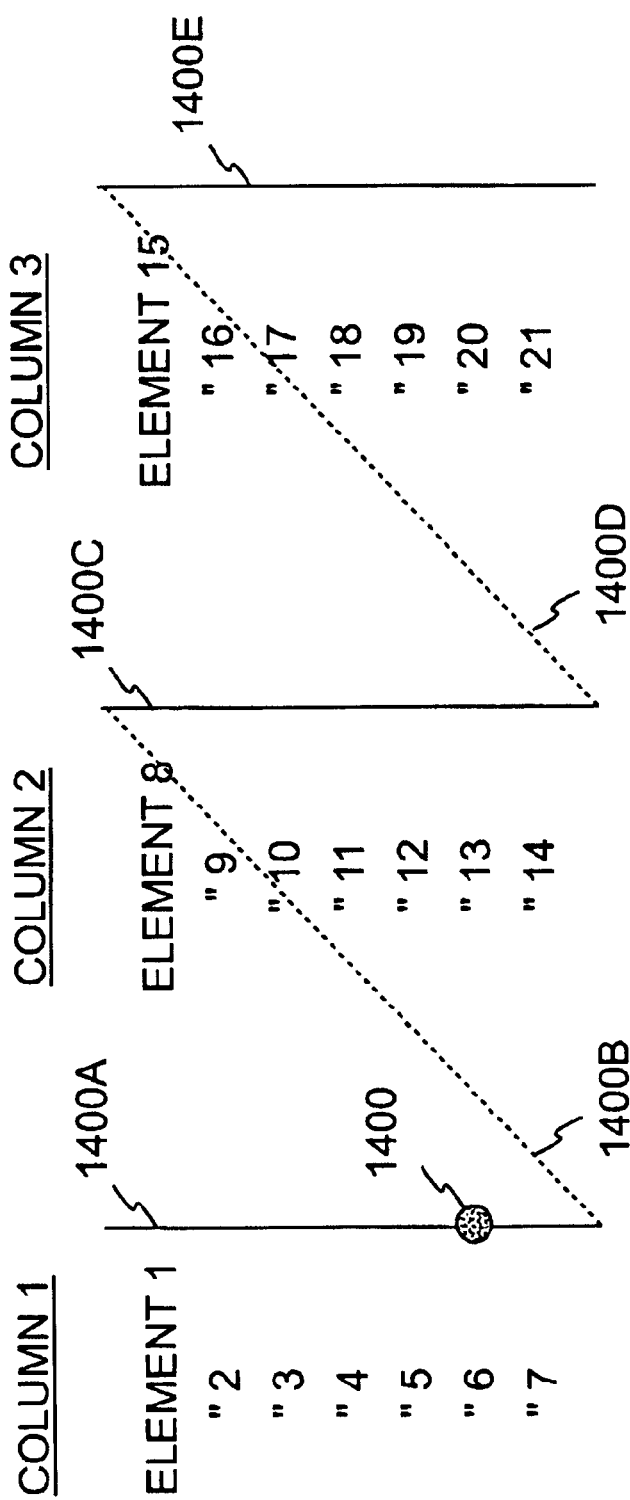
FIG. 14 illustrates use of a single scroll bar to handle a linear list spread across multiple columns.

FIG. 14 illustrates use of a single scroll bar used to handle a linear list spread across multiple columns. In FIG. 14, a linear list consisting of twenty-one elements designated elements 1–21 are arranged in a three column format. A piecewise continuous scroll bar comprising linear portions 1400A, 1400B, 1400C, 1400D and 1400E represent a single continuous scroll bar. The scroll button 1410 is constrained to exist only on scroll bar sections 1400A, 1400C and 1400E. If a user attempts to drag the scroll button 1410 to a location between those piecewise segments of the scroll bar function, the scrolling button 1410 will not be permitted to stop on segments 1400B or 1400D. Rather, depending upon the direction from which the scroll button 1410 is being dragged, the scroll button will appear at the beginning of the next segment 1400A, 1400C or 1400E. In this way, a single scroll button may be used to select from a linear list of information which would otherwise require three scroll bars and buttons.

There have thus been described scrolling techniques for graphical user interfaces which overcome the problems of the prior art and which provide great functionality and ease of use in a graphical user interface.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. Apparatus comprising:
   a. a computer having a display; and
   b. a graphical user interface running on said computer, said graphical user interface configured to display at least one scroll bar of a single pixel width,
   wherein opacity of the at least one scroll bar is controlled by proximity of a cursor to the scroll bar or by the selection of a scroll button.

2. Apparatus of claim 1 in which said scroll bar is invisible until the cursor is within a certain proximity of said scroll bar.

3. Apparatus of claim 1 in which said scroll bar is displayed with different degrees of opacity based on the proximity of the cursor.

4. An apparatus comprising:
   a computer having a display; and
   a graphical user interface running on said computer, said graphical user interface configured to display at least one scroll bar of a single pixel width in which the scroll bar is displayed with a scroll button having a size much greater than a single pixel in each of two dimensions.

5. Apparatus of claim 4 in which said scroll button is displayed with different degrees of opacity.

6. Apparatus of claim 5 in which said opacity is controlled by proximity of a cursor to the scroll button or by the section of the scroll button.

7. An apparatus comprising:
   a computer having a display; and
   a graphical user interface running on said computer, said graphical user interface configured to display at least one scroll bar of a single pixel width, in which an input/output device for controlling a cursor provides tactile feedback to a user when the cursor approaches or crosses a scroll bar.

8. Apparatus of claim 7 in which said input/output device provides tactile feedback to a user when the cursor approaches or crosses a scroll button for a scroll bar.

9. Apparatus of claim 7 in which said input/output device provides resistance to movement of the cursor away from a scroll path when a scroll button is selected.

10. An apparatus comprising:

a computer having a display;

a graphical user interface running on said computer, said graphical user interface configured to display at least one scroll bar of a single pixel width; and an eyetracker, and in which the scroll bar has a scroll button thereon in which the opacity of the scroll bar is determined as a function of the length of time a user gazes at said scroll button.

11. Apparatus of claim 10, in which selection of said scroll button is determined by the amount of time a user gazes at the scroll button.

12. Apparatus of claim 11 in which location of said scroll button can be changed by first selecting a scroll button as a function of the amount of time a user gazes at the scroll button and by then detecting a change in location of the user's gaze.

13. An apparatus comprising:

a computer having a display; and a graphical user interface running on said computer, said graphical user interface configured to display at least one scroll bar of a single pixel width, in which a path defined by said scroll bar is non-linear.

14. Apparatus of claim 13 in which said path can be any path in N dimensional space.

15. Apparatus of claim 14 in which N=2.

16. Apparatus of claim 14 in which N=3.

17. A computer program product, comprising:

a. a memory medium; and b. a computer program stored on said memory medium, said computer program comprising instructions for generating a single pixel scroll bar and instructions for controlling the transparency of the scroll bar as a function of the proximity of a cursor to the scroll bar or as a function of the selection of a scroll button.

18. The apparatus of claim 4, further comprising:

a network, wherein the computer is connected to the network.

19. The apparatus of claim 7, further comprising:

a network, wherein the computer is connected to the network.

20. The apparatus of claim 10, further comprising:

a network, wherein the computer is connected to the network.

21. The apparatus of claim 13, further comprising:

a network, wherein the computer is connected to the network.

22. A method of controlling a view of information in a window on a computer having a display comprising the steps of displaying at least one scroll bar of a single pixel width; and controlling a view in a window based on a position of a scroll button on the at least one scroll bar, wherein transparency of at least one of the scroll bar and the scroll button is controlled based on proximity of a cursor.

23. The method of claim 22 in which the scroll bar is invisible by default.

24. The method of claim 22 in which the transparency of at least one of the scroll bar and the scroll button is controlled based on whether the scroll button is selected.

25. The method of claim 22 in which the transparency is controlled as a function of relative weights given to one or more pixels from an image plane and corresponding pixels from a overlay plane.

* * * * *